United States Patent
Moffitt et al.

(10) Patent No.: US 11,339,247 B2
(45) Date of Patent: May 24, 2022

(54) REFILLABLE POLYMER BOTTLE AND METHOD FOR IMPROVED CAUSTIC STRESS CRACK RESISTANCE

(71) Applicant: THE COCA-COLA COMPANY, Atlanta, GA (US)

(72) Inventors: Ronald D. Moffitt, Spartanburg, SC (US); Yu Shi, Marietta, GA (US); Jasmeet Kaur, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 429 days.

(21) Appl. No.: 15/566,233

(22) PCT Filed: Apr. 12, 2016

(86) PCT No.: PCT/US2016/027118
§ 371 (c)(1),
(2) Date: Oct. 13, 2017

(87) PCT Pub. No.: WO2016/168188
PCT Pub. Date: Oct. 20, 2016

(65) Prior Publication Data
US 2018/0079859 A1    Mar. 22, 2018

Related U.S. Application Data

(60) Provisional application No. 62/146,738, filed on Apr. 13, 2015.

(51) Int. Cl.
*C08G 63/199*    (2006.01)
*C08G 63/183*    (2006.01)
(Continued)

(52) U.S. Cl.
CPC ........ *C08G 63/199* (2013.01); *B29C 49/0005* (2013.01); *B29C 49/06* (2013.01);
(Continued)

(58) Field of Classification Search
CPC .. C08G 63/199; C08G 63/183; C08G 63/189; B29C 49/0005; B29C 49/06;
(Continued)

(56) References Cited

U.S. PATENT DOCUMENTS 5,409,983 A * 4/1995 Jones ................... C08K 3/08
                                                    524/439
6,306,936 B1 * 10/2001 Wood ................. B01D 69/141
                                                    524/48
(Continued)

FOREIGN PATENT DOCUMENTS

WO    2003/061956 A2    7/2003
WO    2005/070996 A1    8/2005

OTHER PUBLICATIONS

International Search Report and Written Opinion for PCT/US2016/027118, dated Sep. 2, 2016.

*Primary Examiner* — Matthew J Daniels
*Assistant Examiner* — Shibin Liang
(74) *Attorney, Agent, or Firm* — Eversheds Sutherland (US) LLP

(57) ABSTRACT

This disclosure provides new methods, compositions, containers, preforms, and designs for refillable carbonated soft drink bottles having improved caustic stress cracking resistance. The method of this disclosure combine the use of PET-based co-polyester resin that incorporates a cyclic hydrocarbon diacid co-monomer and/or a cyclic hydrocarbon diol comonomer, with a bottle design incorporating a petaloid base, for unexpectedly enhanced performance.

12 Claims, 1 Drawing Sheet

(51) Int. Cl.
  *B29C 49/00* (2006.01)
  *B29C 49/06* (2006.01)
  *B29C 49/08* (2006.01)
  *C08G 63/189* (2006.01)
  *B29C 49/10* (2006.01)
  *B29K 67/00* (2006.01)
  *B29K 105/00* (2006.01)
  *B29L 31/00* (2006.01)

(52) U.S. Cl.
  CPC ............ *B29C 49/08* (2013.01); *C08G 63/183* (2013.01); *C08G 63/189* (2013.01); *B29C 49/10* (2013.01); *B29K 2067/003* (2013.01); *B29K 2105/0002* (2013.01); *B29L 2031/7158* (2013.01); *C08L 2203/10* (2013.01)

(58) Field of Classification Search
  CPC ... B29C 49/08; B29C 49/10; B29C 2067/003; B29C 2105/0002; B29C 2031/7158; C08L 2203/10
  See application file for complete search history.

(56) References Cited

U.S. PATENT DOCUMENTS

| | | | |
|---|---|---|---|
| 6,342,578 B1 | 1/2002 | Huang | |
| 7,087,706 B2 | 8/2006 | Caldwell | |
| 7,803,440 B2 * | 9/2010 | Crawford | A47F 5/00 |
| | | | 428/35.7 |
| 8,968,849 B2 * | 3/2015 | Scantlebury | B65D 1/0207 |
| | | | 428/35.7 |

* cited by examiner

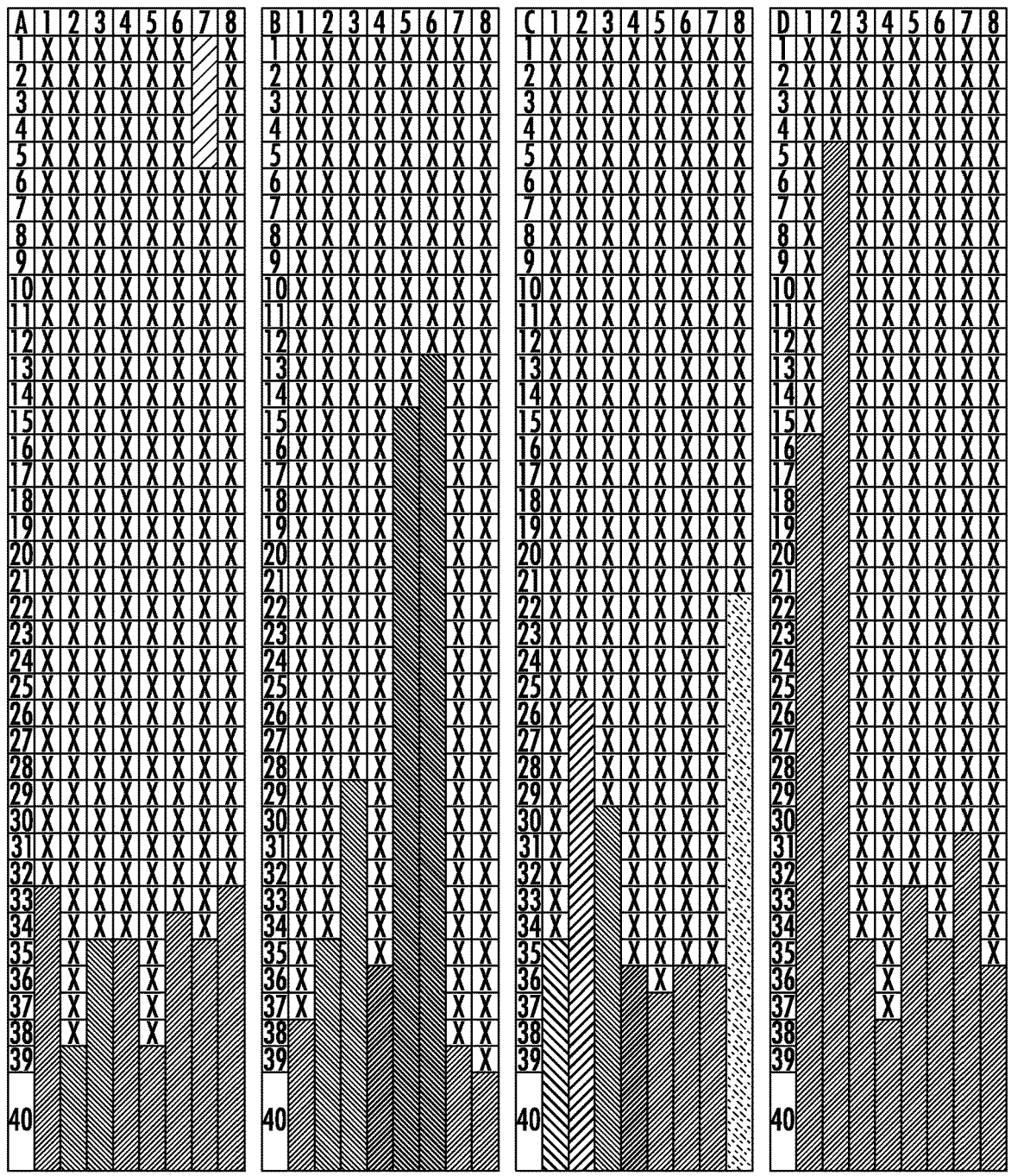

REFILLABLE POLYMER BOTTLE AND METHOD FOR IMPROVED CAUSTIC STRESS CRACK RESISTANCE

CROSS REFERENCE TO RELATED APPLICATIONS

This application claims priority to and the benefit of U.S. Provisional Patent Application No. 62/146,738 filed Apr. 13, 2015, which is incorporated herein by reference in its entirety, and is a 35 U.S.C. § 371 national stage application of PCT Patent Application No. PCT/US2016/027118, filed Apr. 12, 2016, which is incorporated by reference in its entirety.

TECHNICAL FIELD

This disclosure relates to refillable carbonated soft drink bottles having improved caustic stress cracking resistance, and methods and compositions for their production.

BACKGROUND

Polyethylene terephthalate (PET) containers have been used for packaging beverages such as carbonated soft drinks (CSD) for many years. Refillable CSD bottles represent a growing aspect of renewable and sustainable packaging applications. Refillable CSD bottles often can be reused 20 or more refilling cycles before neck and base cracking necessitates removing the bottle from circulation and routing it to a recycling processor. Neck and base cracking generally derives from caustic stress cracking that etches and damages the bottle, resulting from the high temperature caustic (aqueous base) washing process used for sterilization.

Roughly 40% of refillable bottles that are rejected for rebottling are rejected for reasons associated with caustic stress cracking. Consequently, a refillable CSD bottle that is more resistant to high temperature caustic washing is needed. New compositions and/or methods for making more resistant refillable bottles are also desirable. Bottles with improved caustic stress crack resistance (CSCR) would likely increase bottle cycle times (packaging life cycle) and decrease adverse environmental impacts associated with beverage packaging.

SUMMARY

This disclosure provides generally new methods and compositions for refillable CSD bottles that are more resistant to high temperature caustic washing, that is, having improved CSCR properties.

Refillable CSD bottles are generally fabricated from the thermoplastic polyester resin polyethylene terephthalate (also written poly(ethylene terephthalate)), which formally contains polymerized units of the monomer ethylene terephthalate with repeating $C_{10}H_8O_4$ moieties. Without intending to be bound by any theories or mechanisms, PET is generally synthesized from its monomer bis(2-hydroxyethyl) terephthalate, which itself can be prepared by the esterification reaction between terephthalic acid and ethylene glycol with water as a byproduct (Equation 1), or by transesterification reaction between ethylene glycol and dimethyl terephthalate with methanol as a byproduct (Equations 2 and 3). Polymerization of the resulting bis(2-hydroxyethyl) terephthalate is through a polycondensation reaction of the monomers which is effected immediately after esterification or transesterification reactions, with water as the byproduct.

Esterification (Equation 1)

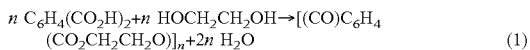

$$n\ C_6H_4(CO_2H)_2 + n\ HOCH_2CH_2OH \rightarrow [(CO)C_6H_4(CO_2CH_2CH_2O)]_n + 2n\ H_2O \quad (1)$$

Transesterification (Equations 2 and 3)

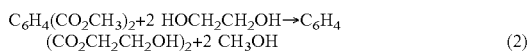

$$C_6H_4(CO_2CH_3)_2 + 2\ HOCH_2CH_2OH \rightarrow C_6H_4(CO_2CH_2CH_2OH)_2 + 2\ CH_3OH \quad (2)$$

$$n\ C_6H_4(CO_2CH_2CH_2OH)_2 \rightarrow [(CO)C_6H_4(CO_2CH_2CH_2O)]_n + n\ HOCH_2CH_2OH \quad (3)$$

Some research activities aimed at improving the CSCR of refillable polymer bottles have focused upon using co-polyester resins that incorporate co-monomers in combination with terephthalic acid. Generally, suitable co-monomers are thought to have reduced mobility conformers which increase the resin glass transition temperature and reduce crystallinity and crystallization rates, thereby enabling more refilling and washing cycles before failure. However, gains in refillable polyethylene terephthalate (refPET) bottle performance attributed to such resin modifications have been very modest. Moreover, previous studies have cautioned that these moderate improvements are attainable only with very limited PET bottle designs. For example, U.S. Pat. No. 5,409,983 (the '983 patent) emphasizes that petaloid base bottles fabricated from co-polyester resins are wholly unsuitable for refilling, due to the undesirable orientation and/or weakening of the polymer upon stretching, inducing crystallization and/or increasing its susceptibility to stress cracking. Applicants hereby incorporate all co-polyesters of the '983 patent by reference.

It has now been unexpectedly discovered that by employing certain diacid and/or diol co-units (co-monomers) to form co-polyester resins that acceptably limit crystallization, in combination with incorporating a sufficiently low-stress petaloid base design in the bottle, a surprising improvement in the CSCR performance is attained. Surface etching and stress cracking normally result from repeated exposure to a high temperature caustic solution, followed by rinsing and pressurization. The observation that the molecular features and structure of the diacid and/or diol co-monomers and the resultant PET composition, in combination with a petaloid base bottle, can reduce etching and stress cracking arising from such harsh conditions provides an unexpected benefit and method to using the new compositions. Conventional designs teach away from using this combination of features in refillable polymer bottles.

In one aspect, for example, this disclosure provides a method of improving the caustic stress crack resistance of a refillable polymer bottle, the method comprising:
a) providing a PET-based co-polyester resin comprising greater than 0 mol % and up to about 20 mol % combined total of a cyclic hydrocarbon diacid co-monomer and a cyclic hydrocarbon diol co-monomer, based on the total diacid and diol monomer content in the co-polyester resin;
b) fabricating a preform from the PET-based co-polyester resin; and
c) stretch blow molding the preform into a refillable polymer bottle having a petaloid base.

In a further aspect, for example, this disclosure provides a method of improving the caustic stress crack resistance of a refillable polymer bottle, the method comprising:

a) providing a PET-based co-polyester resin comprising from about 0.05 to about 20 mol % combined total of a cyclic hydrocarbon diacid co-monomer and a cyclic hydrocarbon diol co-monomer, based on the total diacid and diol monomer content in the co-polyester resin;

b) fabricating a preform from the PET-based co-polyester resin; and c) stretch blow molding the preform into a refillable polymer bottle having a petaloid base;

wherein the bottle is a 2.5 liter bottle comprising at least about 90 grams of PET-based co-polyester resin.

Aspects of PET bottles appear in the following U.S. Patents and published applications: U.S. Pat. Nos. 5,409,983; 5,520,877; and 6,342,578; and in U.S. Patent Appl. Publication No. 2013/0004693.

These and various other aspects and embodiments of this disclosure are illustrated in the drawings, examples, data, and detailed description that follow.

BRIEF DESCRIPTION OF THE FIGURES

FIG. 1 provides data for bottle performance in 30+-loop caustic wash tests for three petaloid base bottles (FIG. 1A-1C), compared to a champagne base bottle (FIG. 1D), as follows:

FIG. 1A provides data for bottle performance in 30+-loop caustic wash tests for a Petaloid Base bottle fabricated from DAK Laser+9921 (CHDM-Modified Resin) ("9921").

FIG. 1B provides data for bottle performance in 30+-loop caustic wash tests for a Petaloid Base bottle fabricated from Indorama T-94 ("T-94").

FIG. 1C provides data for bottle performance in 30+-loop caustic wash tests for a Petaloid Base bottle fabricated from 5 mol % naphthalene-2,6-dicarboxylic acid (NDC) co-polyester resin Petaloid Base ("NDC resin").

FIG. 1D provides comparative data for bottle performance in 30+-loop caustic wash tests for a Graham Production, Champagne Base bottle fabricated from DAK Laser+9921.

DETAILED DESCRIPTION

Aspects of this disclosure provide for new methods, compositions, preforms, and containers or bottles, that improve the caustic stress crack resistance (CSCR) of certain refillable polymer bottles made from the compositions and preforms. This disclosure further provides for containers or bottles, particularly beverage packaging, that can increase bottle cycle times (packaging life cycle) while decreasing any adverse environmental impact associated with poor-performing refillable beverage packaging.

The following definitions are provided to further explain and elaborate various aspects of this disclosure.

The term "Carbonated Soft Drink (CSD)" bottles or container is used herein to refer to the containers of this disclosure that are designed for use under pressure, such as carbonation, without specific limitation as to the intended contents of the container. Generally, the term "container" is used interchangeably with the term "bottle" unless the context requires otherwise.

"Crystallinity" and "percent crystallinity" measure the alignment or partial alignment of polymer chains in the fabricated bottle that result due to the preform design, structure, and composition, as well as fabrication methods such as mechanical stretching and cooling. More highly crystalline polymers are less permeable, exhibit lower creep and are generally more optically transparent. In this disclosure, crystallinity is generally reported as a percent and is measured by sampling the bottle at the base at known distances from the gate. Percent crystallinity is estimating according to density measurements using known methods, for example, as in ASTM D1505.

"Polycyclic aromatic hydrocarbons" (PAH), also referred to as a "polyaromatic hydrocarbons" are hydrocarbons—organic compounds containing only carbon and hydrogen in their unsubstituted form—that are composed of multiple aromatic rings (organic rings in which the electrons are delocalized). A "polynuclear aromatic hydrocarbon" (PNA) is a subset of PAH compounds that has fused aromatic rings, that is, rings that share one or more sides. The use of the prefix "poly" and terms that include "poly" includes two (2), therefore "poly" as used herein means two or more than two. Examples include biphenyl, naphthalene, anthracene, and phenanthrene.

"Polycyclic hydrocarbons" (PCH) are hydrocarbon compounds (organic compounds containing only carbon and hydrogen in their unsubstituted form) that are composed of multiple carbon rings that can be in any saturation state. That is, the carbon rings of a PCH can be saturated, unsaturated, aromatic, or a combination thereof. PCH compounds include PAH compounds, and PCH compounds also can have fused rings, rings that are not fused, or both. As in PAH compounds, the use of the prefix "poly" and terms that include "poly" when describing PCH compounds is intended to include two (2), therefore "poly" as used herein means two or more than two. Examples include decahydronaphthalene (containing two fused cyclohexane rings), 1,2,3,4-tetrahydronaphthalene, 2,3-dihydro-1H-indene, and octahydro-1H-indene.

A "co-polyester" resin is a polyethylene terephthalate-based polyester resin that contains units derived from at least one other dicarboxylic acid co-monomer along with the terephthalic acid co-monomer in the polymer resin structure and/or at least one other diol co-monomer along with the ethylene glycol co-monomer in the polymer resin structure. These resins may also be referred to as a polyethylene terephthalate (PET)-based co-polyester resin. Typically, the mole fraction or percentage of the total other dicarboxylic co-monomers is less than the mole fraction or percentage of terephthalic acid co-monomers in the resin. Also typically, the mole fraction or percentage of the total other diol co-monomers is less than the mole fraction or percentage of ethylene glycol co-monomers in the resin.

Co-polyester PET resins employed in the manufacture of refillable CSD bottles can comprise 1,4-cyclohexanedimethanol (CHDM) or isophthalic acid (IPA) as diol or terephthalic acid co-monomers, respectively. While not intending to be theory bound, it is thought that the incorporation of these co-monomers may lead to disruption of chain orientation or crystallinity development in the co-polyester PET resin as compared to PET resins. However, conventional designs teach against fabricating bottles with a petaloid base using such co-momoners.

CHDM

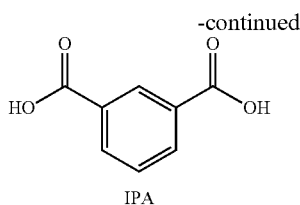

IPA

While co-polyester PET resins employing one of these co-monomers are used for the manufacture of conventional champagne base refillable CSD bottles, these bottles rarely survive 20 refilling and distribution loops without incurring significant surface etching and cracking from exposure to the high-temperature caustic wash conditions.

This disclosure provides, among other things, new compositions, preforms, containers, and methods related to refillable CSD bottles, in which the bottles can survive 25 or more refilling and distribution cycles before etching and cracking becomes significant. It has now been surprisingly and unexpectedly discovered that by employing certain diacid and/or diol co-units (co-monomers) to form co-polyester resins that acceptably limit crystallization, in combination with incorporating a sufficiently low-stress petaloid base design in the bottle, a surprising improvement in the CSCR performance is attained. That is, it is the unexpected combination of the molecular features and structure of the diacid and/or diol co-monomer and the resultant PET composition, along with a petaloid base bottle, that can reduce etching and stress cracking arising from caustic wash. Moreover, conventional designs teach away from using this combination of features in refillable polymer bottles.

Surprisingly, it has further been found that polycyclic hydrocarbon (PCH) diacids, including polycyclic aromatic hydrocarbons (PAH, also termed polyaromatic hydrocarbon) diacids can be used as co-monomers for preparing co-polyester PET resins, and refillable CSD bottles prepared from such resins exhibit improved caustic stress crack resistance (CSCR), when combined with a petaloid base bottle. Conventional designs also teach against using this combination of features in refillable polymer bottles. Particularly useful PCH and PAH compounds are those in which the acid functional groups are bonded to different cyclic groups of the polycyclic structure.

Formally, the term polycyclic hydrocarbon (PCH) compounds (diacids) include compounds in which all polycyclic rings are saturated, all polycyclic rings are unsaturated, or a combination of saturated and unsaturated rings occur in the PCH compound. Unless specified otherwise or unless the context does not allow, the disclosure that a PCH co-monomer can be used for a particular co-polyester PET resin and bottle is intended to convey that a PAH co-monomer also can be used for the co-polyester PET resin and bottle, and vice versa.

Similarly, suitable PCH diacid and PAH diacid co-monomers can include diacid compounds in which the polycyclic or polyaromatic groups can be fused rings, not-fused rings, or a combination thereof. As disclosed, "poly" in polycyclic or polyaromatic means two or more (more than one).

Examples of the polycyclic hydrocarbon (PCH) and polyaromatic hydrocarbon (PAH) groups that can be used in the diacid co-monomers according to this disclosure include, but are not limited to, naphthalene, anthracene, phenanthrene, tetracene, triphenylene, biphenyl, and terphenyl. Moreover, any isomer of the PCH and PAH diacids can be used according to this disclosure. For example, the disclosure that terphenyl diacid can be used encompasses the use of ortho-, meta-, and para-terphenyl, and further encompasses any diacid regioisomer. Especially useful PCH and PAH diacids include the two acid functional groups bonded to different cyclic moieties of the polycyclic structure.

A particularly useful diacid co-monomer for preparing containers of this disclosure is the naphthalene diacids, including naphthalene-2,6-dicarboxylic acid (NDC). The NDC co-monomer provides a co-polyester PET resin that affords refillable CSD bottles having unexpectedly improved CSCR when fabricated with a petaloid base. Other the naphthalene diacids also can be used according to this disclosure.

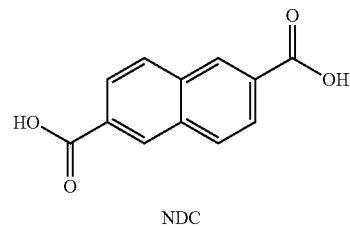 [SMILES: O=C(O)c1ccc2cc(C(=O)O)ccc2c1 ; "NDC"]

NDC

This disclosure also provides for a method of improving the caustic stress crack resistance of a refillable polymer bottle, using a diol co-monomer either alone or in combination with a diacid co-monomer, in combination with a petaloid base. In this aspect, the PET-based co-polyester resin can comprise from greater than 0 mol % to up to about 20 mol % total of a cyclic hydrocarbon diacid co-monomer and/or a cyclic hydrocarbon diol co-monomer, based on the total diacid and diol monomer content in the co-polyester resin. Suitable cyclic hydrocarbon diol co-monomers include or comprise, but are not limited to, the following diols: 1,4-cyclohexanedimethanol (CHDM) (cis, trans or as cis/trans mixtures),

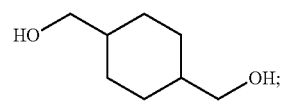

1,4-di-(hydroxyethoxy)benzene (also termed 2,2'-(1,4-phenylenebis(oxy))diethanol),

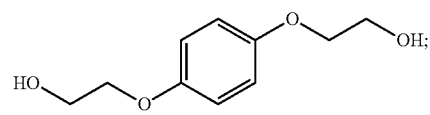 [SMILES: OCCOc1ccc(OCCO)cc1]

2,2-bis-(4-hydroxycyclohexyl)propane,

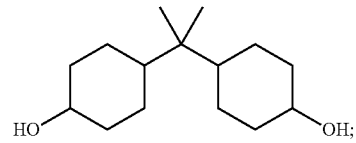 [SMILES: CC(C)(C1CCC(O)CC1)C1CCC(O)CC1]

2,2'-bis-(3-hydroxyethoxyphenyl)propane (also termed 2,2'-((propane-2,2-diylbis(3,1-phenylene))bis(oxy))diethanol)),

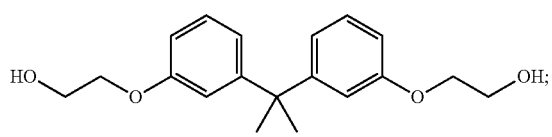 [SMILES: CC(C)(c1cccc(OCCO)c1)c1cccc(OCCO)c1]

and/or 2,2'-bis-(4-hydroxypropoxyphenyl)propane (also termed 3,3'-((propane-2,2-diylbis(4,1-phenylene))bis(oxy))bis(propan-1-ol)),

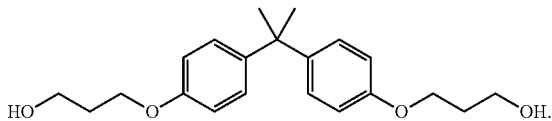 [SMILES: CC(C)(c1ccc(OCCCO)cc1)c1ccc(OCCCO)cc1]

Useful amounts of diacid and/or diol co-monomer are typically expressed in the mole (mol) percentages, and the diacid and/or diol co-monomers can be used in the resins according to this disclosure in any amount, and the amounts will generally vary depending on the specific co-monomer to be incorporated. For example, the PET-based co-polyester resin can comprise greater than 0 mol % and up to about 20 mol % combined total of a cyclic hydrocarbon diacid co-monomer and a cyclic hydrocarbon diol co-monomer, based on the total diacid and diol monomer content in the co-polyester resin. That is, at least one co-monomer is present, but if desired, the co-polyester resin can comprises either 0% diacid co-monomer or 0% cyclic hydrocarbon diol co-monomer.

For example, the total diacid and/or diol co-monomer that can be incorporated into the resin in ranges of about: from 0.01 to 20 mol %; alternatively from 0.1 to 15 mol %; alternatively, from 0.5 to 10 mol %; alternatively, from 1 to 7 mol %; or alternatively, from about 2 to 5 mol % of the total diacid monomer content. According to another aspect, the diacid and/or diol co-monomer can be incorporated into the resin in mole percentages of about 0.01 mol %, 0.02 mol %, 0.05 mol %, 0.1 mol %, 0.2 mol %, 0.5 mol %, 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, or 20 mol % of the total diacid monomer content. The diacid and/or diol co-monomer also may be incorporated into the resin in ranges between any of these specific recited mole percentages (for example, from about 0.5 mol % to about 6 mole %), or alternatively still, may be present at less than, or less and equal to, any of these specific recited mole percentages (for example, less than about 20 mol % or less than about 10 mol %).

The PET co-polymer resins incorporating the diacid and/or diol co-monomers such as PCH diacid and PAH diacid co-monomers, in the mole percentages outlined herein, can have an intrinsic viscosity of from about 0.1 to about 2.0 dL/g. Alternatively, the PET co-polymer resins can have an intrinsic viscosity of from about 0.2 to about 1.5 dL/g; alternatuively, from about 0.3 to about 1.2 dL/g; and alternatively still, from about 0.4 to about 1.0 dL/g. In another aspect, the PET co-polymer resins incorporating the diacid and/or diol co-monomers in the mole percentages disclosed herein can have an intrinsic viscosity of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, or about 2.0.

As the Examples and Figure demonstrate, the performance of a petaloid design bottle was examined for caustic stress behavior using a range of resins, and compared to a conventional champagne base bottle. Please see the following table.

TABLE 1

Table 1 depicts volume versus mass difference between a champagne and petaloid base bottle.

| Bottle Volume (L) | Approximate Champagne Base Bottle Masses (g) | | | Approximate Low-Stress Petaloid Base Bottle Masses (g) | | |
|---|---|---|---|---|---|---|
| | Target | Low | High | Target | Low | High |
| 0.5 | 65 | 45 | 85 | 35 | 15 | 55 |
| 1 | 80 | 60 | 100 | 50 | 30 | 70 |
| 1.5 | 100 | 75 | 115 | 65 | 45 | 85 |
| 2.0 | 105 | 90 | 130 | 80 | 60 | 100 |
| 2.5 | 125 | 105 | 145 | 95 | 70 | 120 |
| 3.0 | 140 | 120 | 160 | 105 | 85 | 125 |
| 3.5 | 155 | 135 | 175 | 120 | 100 | 140 |
| 4.0 | 168 | 145 | 190 | 135 | 115 | 155 |

In one embodiment of the present invention, the 2.5 liter petaloid bottle mass was raised from the conventional 88.0 g to over 90 grams, typically 93.0 g, and the petaloid base design was implemented and examined for caustic stress performance. The maximum number of wash loops sustained by the various bottles demonstrated significant differences, with the petaloid bottle produced using DAK Laser+RF 9921 PET (CHDM-modified copolyester) exhibiting the best performance with no failures (finish, base, or neck) after 30 cycles.

The caustic wash loop test result for the petaloid base refPET bottle is surprising since the 93.0-gram (g) bottle performs substantially better (more wash loop cycles) than the Graham production control bottle with the champagne base (119 g). That is, the petaloid base refPET bottle is at least 26 g lighter than the Graham production bottle, yet exhibited significantly better CSCR performance. Generally, heavier bottles would be expected to perform better in such situations, but in view of the contradictory teachings of U.S. Pat. No 5,409,983, the petaloid design provides a novel and beneficial approach to refillable bottle design.

It is not the intention to limit this invention to the polyester and copolyester resins disclosed herein. Rather, the data suggest that the petaloid base, if properly designed to provide base stresses in the vicinity of preferably about 45 MPa or lower, more preferably 40 MPa or lower, or most preferably 35 MPa or lower, using a polyester or copolyester suitable for refillable bottle production. As base stresses under carbonation load and elevated storage temperature are a function of the mass distribution of resin in the bottle, especially in the neck and base, and the dimensions of the bottle, especially wall thickness distribution, limits and ranges of these parameters would be helpful in defining the scope of the invention. These limits and ranges, however, should be similar (possibly slightly broader) to those given in U.S. Pat. No. 5,409,983.

As demonstrated herein, it has been discovered that chain disrupting co-monomers currently used in the production of co-polyesters for refillable bottle applications generally do not provide adequate CSCR to enable the bottle to survive 25 refilling/distribution loops without incurring significant surface etching and cracking, absent the incorporation of a petaloid base in the bottle. For example, resins incorporating the monocyclic 1,4-cyclohexanedimethanol (CHDM) or isophthalic acid (IPA) co-monomers were used to prepare bottles and tested against bottles incorporating the naphthalene-2,6-dicarboxylic acid (NDC) co-monomer for their performance.

EXAMPLES

The results of the tests provided in the Examples section and the Figures demonstrate the unexpected relationship between bottle base design, PET resin composition, and CSCR, with an emphasis on the impact of resin composition combined with bottle base design on CSCR.

Methods

The following resins were used in the tests: DAK Laser+ 9921, Indorama T94, and NDC resin. These resins were molded and blown into both the 2.5 L refPET bottles with petaloid base designs to test for stress crack resistance against control production champagne base refPET container. The following bottles were examined using these resins.

Bottle A. DAK Laser+9921 (CHDM-Modified Resin) Petaloid Base ("9921");
Bottle B. Indorama T-94 (IPA-Modified Resin) Petaloid Base ("T-94");
Bottle C. 5 mol % naphthalene-2,6-dicarboxylic acid (NDC) co-polyester resin Petaloid Base (NDC resin); and
Bottle D. DAK Laser+9921 Graham Production bottle, Champagne Base ("Comparative").

The PET resins were dried a minimum of four hours at 325° F. prior to injection molding. Preforms were molded on an Arburg unit cavity system using a general purpose 45 mm screw with a cold runner gate. The injection molding process was optimized for each material to produce an acceptable part with the minimum cycle time by reducing the injection time, cooling time, and hold pressure and time as much as possible while maintaining good part quality. The Colormatrix Joule reheat additive was incorporated into the NDC resin material at 0.06% to ensure efficient reheating during blow molding.

In the petaloid perform, all three materials were processed at similar barrel set point temperatures with comparable injection mold filling times (8.1-8.3 seconds). The Indorama required a slightly lower hold pressure to fully form the preform when compared to the other two resins. The Indorama T94 required a longer cooling time which increased the cycle time for the preforms molded from that material by approximately 8 seconds. The petaloid design bottle was blown from a 93 g (gram) preform, and the comparative Graham Production, Champagne Base bottle was a 125 gram bottle.

The petaloid bottles were blown into a warm blow mold at two different temperatures, 110° F. and 140° F. Those blown at the lower temperature were used for bottle physical testing and the bottles produced at the 140° F. temperature were used for caustic loop testing. The increased blow mold temperature was intended to relax out the blown-in stresses and improve bottle performance. The mold base temperature was maintained at 45° F.

Caustic Wash Testing and Results

A severe caustic wash protocol was employed as follows. Eight bottles for each variable along were evaluated according to the modified Graham caustic wash testing procedure. Eight fresh production bottles served as control bottles. The petaloid (bottle tests A-C above) and champagne production control (bottle test D above) were tested separately with a control set tested for each bottle design. FIGS. 1A-1C show the results of testing of the eight bottles for resins and bottles A-C (above) in a petaloid base design, and FIG. 1D show the comparative results of testing of the eight bottles for resin and bottle D in the champagne base commercial bottle design.

The bottles were randomly dispersed during the caustic wash testing. The bottles were initially measured for the fill point volume, height, label panel and pinch diameters, and base clearance. They were then carbonated to 4.5 volumes of $CO_2$ and stored overnight at 100° F., 50% RH (5 relative humidity) prior to subjecting them to the wash test which included the following steps:

1. Immersed bottles in 3.5% caustic solution at 60°±0.3° C. for 15 minutes;
2. Removed bottles, rinsed thoroughly inside and outside using cool water;
3. Pressure tested at 125 psi for 30 seconds;
4. Pressure tested at 45 psi for 7.5 seconds, repeated four additional times;
5. Visually inspected and captured the base image;
6. Repeated cycle steps 1-5 until failure or the completion of 25 cycles;
7. At loops 1, 5, 10, 15, 20 and 25 the container measurements were taken again. After loops 5, 10, 15, and 20, bottles were carbonated again to 4.5 volumes of CO2 and stored overnight in an environment at 100° F., 85% RH.
8. After the final loop, bottles were inspected and scored using the Loop Test Standards.

Extreme care was taken to ensure that the testing conditions were as similar as possible between the petaloid and comparative champagne bottle testing so that the results could be compared to one another. The tables shown in FIG. 1 record the outcome of the caustic wash testing for each of the bottles tested. In the vertical direction is the wash number and the horizontal direction shows the bottle set (A-D) and test bottle number. Those cells without red (or gray) shading indicate that the bottles "passed" that loop without catastrophic failure. Those cells filled with red had a catastrophic failure of some type. The specific failure type is noted in the column for each failure.

The petaloid bottles passed through 25 loops with no base failures or bursts whatsoever, and thus the testing was carried out through loop 40. Two resin/bottle B bottles cracked in the finish area early in the testing, but this was determined to be a result of excessive torque during the bottle threading into a fixture. A bottle from set C (NDC resin), failed at loop 22 with the finish cracking and bursting during the pressurization test. Two production control bottles failed early in the testing at loops 5 and 12 and then the remainder of the control bottles failed in loops 31 through 40 with all bottles failing.

Further testing of various champagne base bottles was undertaken, and the results examined alongside the tests for the petaloid base bottles. The following summary of these test results is provided for the 2.5 liter refPET bottle fabrication and testing.

a. In the caustic wash testing, the petaloid container design had a statistically significant higher average failure loop compared to the champagne bottle design. Significantly more base crazing resulting from the caustic washing was observed in the champagne design when compared with the petaloid base design. Again, the combination of the co-monomers described in this disclosure was used against the teachings of the prior art in a petaloid base bottle, which showed improved performance as compared with the conventional champagne base bottle.
b. Burst test results indicate all bottles met the specification. The performance of washed and unwashed bottles was similar for all resin sets. The champagne bottles had base failures during burst. However, no petaloid bottles failed in this mode.
c. The thermal stability testing indicates lower expansion in the petaloid design, although all bottles had high growth in the pinch area. The thermal stability performance was similar before and after caustic washing.
d. No failures were observed during drop impact testing for either the champagne or petaloid base design.
e. Sidewall tensile measurements showed higher radial modulus in the champagne containers when compared to the petaloid design.

The disclosures of various publications that may be referenced throughout this specification are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components.

Unless indicated otherwise, when a range of any type is disclosed or claimed, for example a range of the percentages, temperatures, diameters, and the like, it is intended to disclose or claim individually each possible number that such a range could reasonably encompass, including any sub-ranges or combinations of sub-ranges encompassed therein. When describing a range of measurements such as these, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

For any particular compound disclose herein, the general structure presented is also intended to encompass all conformational isomers and stereoisomers that may arise from a particular set of substituents, unless indicated otherwise. Thus, the general structure encompasses all enantiomers, diastereomers, and other optical isomers whether in enantiomeric or racemic forms, as well as mixtures of stereoisomers, as the context permits or requires. For any particular formula that is presented, any general formula presented also encompasses all conformational isomers, regioisomers, and stereoisomers that may arise from a particular set of substituents, unless otherwise indicated.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

The following numbered aspects, embodiments, and features of the disclosure are provided, with an emphasis on the ability to combine the various features which may disclosed only in certain embodiments, into other disclosed embodiments, as the context and technical reason allow.

1. A method of improving the caustic stress crack resistance of a refillable polymer bottle, the method comprising:
   a) providing a PET-based co-polyester resin comprising greater than 0 mol % and up to about 20 mol % combined total of a cyclic hydrocarbon diacid co-monomer and a cyclic hydrocarbon diol co-monomer, based on the total diacid and diol monomer content in the co-polyester resin;

b) fabricating a preform from the PET-based co-polyester resin; and
c) stretch blow molding the preform into a refillable polymer bottle having a petaloid base.
2. A method according to aspect 1, wherein PET-based co-polyester resin comprises either 0% diacid co-monomer or 0% cyclic hydrocarbon diol co-monomer.
3. A method according to any of the above aspects as the context allows, wherein the diacid co-monomer comprises isophthalic acid (IPA), naphthalene-2,6-dicarboxylic acid (NDC), biphenyl-3,4'-dicarboxylic acid (BPDC), 2,2-diphenylpropane-4,4'-dicarboxylic acid (DPPDC), 4,4'-dicarboxylic benzophenone (DCBP), or diphenylmethane-4,4'-dicarboxylic acid (DPMDC).
4. A method according to any of the above aspects as the context allows, wherein the diol co-monomer comprises 1,4-cyclohexanedimethanol (CHDM), 1,4-di(hydroxyethoxy)benzene, 2,2-bis-(4-hydroxycyclohexyl)propane, 2,2'-bis-(3-hydroxyethoxyphenyl) propane, or 2,2'-bis-(4-hydroxypropoxyphenyl) propane.
5. A method according to any of the above aspects as the context allows, wherein the diacid co-monomer is a polycyclic hydrocarbon (PCH) diacid co-monomer.
6. A method according to any of the above aspects as the context allows, wherein the diacid co-monomer is a polycyclic hydrocarbon (PCH) diacid co-monomer comprising fused polycyclic rings.
7. A method according to any of the above aspects as the context allows, wherein the diacid co-monomer is a polycyclic hydrocarbon (PCH) diacid co-monomer having the acid functional groups bonded to different cyclic groups of the co-monomer.
8. A method according to any of the above aspects as the context allows, wherein the diacid co-monomer is a polycyclic hydrocarbon (PCH) diacid co-monomer comprising a PCH group selected from: decahydronaphthalene; 1,2,3,4-tetrahydronaphthalene; 2,3-dihydro-1H-indene; and octahydro-1H-indene.
9. A method according to any of the above aspects as the context allows, wherein the diacid co-monomer is a polyaromatic hydrocarbon (PAH) diacid co-monomer.
10. A method according to any of the above aspects as the context allows, wherein the diacid co-monomer is a polyaromatic hydrocarbon (PAH) diacid co-monomer comprising fused polyaromatic rings.
11. A method according to any of the above aspects as the context allows, wherein the diacid co-monomer is a polyaromatic hydrocarbon (PAH) diacid co-monomer having the acid functional groups bonded to different cyclic groups of the co-monomer.
12. A method according to any of the above aspects as the context allows, wherein the diacid co-monomer is a polyaromatic hydrocarbon (PAH) diacid co-monomer comprising a PAH group selected from naphthalene, anthracene, phenanthrene, tetracene, triphenylene, biphenyl, and terphenyl.
13. A method according to any of the above aspects as the context allows, wherein the bottle is a 2.5 liter bottle comprising at least about 90 grams of PET-based co-polyester resin.
14. A method according to any of the above aspects as the context allows, wherein the diacid co-monomer is incorporated into the co-polyester resin in the range from about 0.1 to about 15 mol % of the total diacid monomer content.
15. A method according to any of the above aspects as the context allows, wherein the diacid co-monomer is incorporated into the co-polyester resin in the range from about 0.5 to about 10 mol % of the total diacid monomer content.
16. A method according to any of the above aspects as the context allows, wherein the co-polyester resin has an intrinsic viscosity of from about 0.1 to about 2.0 dL/g.
17. A method according to any of the above aspects as the context allows, wherein the bottle is a carbonated soft drink (CSD) bottle.
18. A method of improving the caustic stress crack resistance of a refillable polymer bottle, the method comprising:
a) providing a PET-based co-polyester resin comprising from about 0.05 to about 20 mol % combined total of a cyclic hydrocarbon diacid co-monomer and a cyclic hydrocarbon diol co-monomer, based on the total diacid and diol monomer content in the co-polyester resin;
b) fabricating a preform from the PET-based co-polyester resin; and
c) stretch blow molding the preform into a refillable polymer bottle having a petaloid base;
wherein the bottle is a 2.5 liter bottle comprising at least about 90 grams of PET-based co-polyester resin.
19. A method according to aspect 18, wherein the refillable polymer bottle exhibits about a 30% improvement in base failure rates as a corresponding 2.5 liter champagne base bottle, fabricated under the same conditions as the 2.5 liter petaloid base bottle.
20. A method according to aspect 18 or 19, wherein the refillable polymer bottle exhibits about a 20% improvement in base failure rates as a corresponding 2.5 liter champagne base bottle, fabricated under the same conditions as the 2.5 liter petaloid base bottle, except using up to about 20% less of the PET-based co-polyester resin.
21. A refillable polymer bottle prepared according to any one of the preceding aspects.
22. A packaged beverage comprising the refillable polymer bottle prepared according to aspect 21.

We claim:
1. A method of improving the caustic stress crack resistance of a refillable polymer bottle, the method comprising:
a) providing a PET-based co-polyester resin comprising greater than 0 mol % and up to about 20 mol % combined total of a cyclic hydrocarbon diacid co-monomer and a cyclic hydrocarbon diol co-monomer, based on the total diacid and diol monomer content in the co-polyester resin, the PET-based co-polyester resin having an intrinsic viscosity of from about 0.1 dL/g to about 0.6 dL/g;
b) fabricating a preform from the PET-based co-polyester resin; and
c) stretch blow molding the preform into a refillable polymer bottle having a petaloid base,
wherein the diacid co-monomer comprises biphenyl-3,4'-dicarboxylic acid (BPDC), 2,2-diphenylpropane-4,4'-dicarboxylic acid (DPPDC), 4,4'-dicarboxylic benzophenone (DCBP), or diphenylmethane-4,4'-dicarboxylic acid (DPMDC).
2. The method according to claim 1, wherein PET-based co-polyester resin comprises either 0% diacid co-monomer or 0% cyclic hydrocarbon diol co-monomer.
3. The method according to claim 1, wherein the diol co-monomer comprises 1,4-cyclohexanedimethanol

(CHDM), 1,4-di-(hydroxyethoxy)benzene, 2,2-bis-(4-hydroxycyclohexyl)propane, 2,2'-bis-(3-hydroxyethoxyphenyl)propane, or 2,2'-bis-(4-hydroxypropoxyphenyl)propane.

4. The method according to claim 1, wherein the bottle is a 2.5 liter bottle comprising at least about 90 grams of PET-based co-polyester resin.

5. The method according to claim 1, wherein the diacid co-monomer is incorporated into the co-polyester resin in the range from about 0.1 to about 15 mol % of the total diacid monomer content.

6. The method according to claim 1, wherein the diacid co-monomer is incorporated into the co-polyester resin in the range from about 0.5 to about 10 mol % of the total diacid monomer content.

7. The method according to claim 1, wherein the bottle is a carbonated soft drink (CSD) bottle.

8. The method according to claim 1, wherein:
the PET-based co-polyester resin comprises from about 0.05 to about 20 mol % combined total of a cyclic hydrocarbon diacid co-monomer and a cyclic hydrocarbon diol co-monomer, based on the total diacid and diol monomer content in the co-polyester resin; and
the refillable polymer bottle is a 2.5 liter bottle comprising at least about 90 grams of PET-based co-polyester resin,
wherein the diacid co-monomer comprises biphenyl-3,4'-dicarboxylic acid (BPDC), 2,2-diphenylpropane-4,4'-dicarboxylic acid (DPPDC), 4,4'-dicarboxylic benzophenone (DCBP), or diphenylmethane-4,4'-dicarboxylic acid (DPMDC).

9. The method according to claim 8, wherein the refillable polymer bottle exhibits about a 30% improvement in base failure rates as a corresponding 2.5 liter champagne base bottle, fabricated under the same conditions as the 2.5 liter petaloid base bottle.

10. The method according to claim 8, wherein the refillable polymer bottle exhibits about a 20% improvement in base failure rates as a corresponding 2.5 liter champagne base bottle, fabricated under the same conditions as the 2.5 liter petaloid base bottle, except using up to about 20% less of the PET-based co-polyester resin.

11. The method according to claim 1, wherein the PET-based co-polyester resin comprises greater than 10 mol % and up to about 20 mol % combined total of the cyclic hydrocarbon diacid co-monomer and the cyclic hydrocarbon diol co-monomer, based on the total diacid and diol monomer content in the co-polyester resin.

12. A method of improving the caustic stress crack resistance of a refillable polymer bottle, the method comprising:
a) providing a PET-based co-polyester resin comprising greater than 10 mol % and up to about 20 mol % combined total of a cyclic hydrocarbon diacid co-monomer and a cyclic hydrocarbon diol co-monomer, based on the total diacid and diol monomer content in the co-polyester resin, the PET-based co-polyester resin having an intrinsic viscosity of from about 0.1 dL/g to about 0.6 dL/g;
b) fabricating a preform from the PET-based co-polyester resin; and
c) stretch blow molding the preform into a refillable polymer bottle having a petaloid base,
wherein the diacid co-monomer comprises biphenyl-3,4'-dicarboxylic acid (BPDC), 2,2-diphenylpropane-4,4'-dicarboxylic acid (DPPDC), 4,4'-dicarboxylic benzophenone (DCBP), or diphenylmethane-4,4'-dicarboxylic acid (DPMDC), and
wherein the bottle is a carbonated soft drink (CSD) bottle.

\* \* \* \* \*